United States Patent [19]

Obrecht et al.

[11] Patent Number: 4,920,189

[45] Date of Patent: Apr. 24, 1990

[54] PROCESS FOR THE PRODUCTION OF TOLUENE-SOLUBLE, SULPHUR-MODIFIED CHLOROPRENE POLYMERS

[75] Inventors: Werner Obrecht, Moers; Peter Wendling; Wilhelm Göbel, both of Leverkusen; Eberhard Müller, Dormagen, all of Fed. Rep. of Germany

[73] Assignee: Bayer Aktiengesellschaft, Leverkusen, Fed. Rep. of Germany

[21] Appl. No.: 89,934

[22] Filed: Aug. 25, 1987

Related U.S. Application Data

[63] Continuation of Ser. No. 831,866, Feb. 24, 1986, abandoned.

[30] Foreign Application Priority Data

Mar. 6, 1985 [DE] Fed. Rep. of Germany ....... 3507825

[51] Int. Cl.$^5$ ................................................ C08F 2/26
[52] U.S. Cl. .................................... 526/204; 526/205; 526/220; 526/222; 526/295
[58] Field of Search ................. 526/204, 205, 220, 222

[56] References Cited

U.S. PATENT DOCUMENTS 2,234,215  3/1941  Youker ................................ 526/220
2,430,562  11/1947  Fryling ............................... 526/220

Primary Examiner—Christopher Henderson
Attorney, Agent, or Firm—Connolly and Hutz

[57] ABSTRACT

Toluene-soluble, sulphur-modified polychloroprene is obtained by emulsion copolymerization of chloroprene, sulphur and optionally further monomers which are copolymerisable with chloroprene and sulphur using a peroxy activator and subsequent working-up by stabilising, stopping, degassing and isolating without separate peptisation, in that polymerization is carried out in the presence of dithiocarbamates and/or xanthogenates and the activator is metered in continuously or batchwise during the course of polymerization.

7 Claims, 2 Drawing Sheets

PROCESS FOR THE PRODUCTION OF TOLUENE-SOLUBLE, SULPHUR-MODIFIED CHLOROPRENE POLYMERS

This application is a continuation, of application Ser. No. 831,866, filed Feb. 24, 1986, now abandoned.

This invention relates to a process for the production of toluene-soluble, sulphur-modified chloroprene polymers without a separate peptisation stage.

BACKGROUND OF THE INVENTION

Sulphur-modified polychloroprene rubber has many valuable properties in terms of application and has therefore found a wide field of application. Thus, its ability to be masticated which is greater than for the so-called mercaptan types along with its ability to be vulcanised without the addition of thiourea accelerators are of particularly advantageous value. Moreover, articles which are to be subjected to great dynamic stresses, such as V-belts, are preferably produced from this special type.

The copolymerisation of chloroprene with sulphur in aqueous-alkaline emulsion, which copolymerisation is triggered off by radicals, has been known for a long time and is described, for example, in "Ullmans Encyclopädie der Technischen Chemie", Vol. 9, P. 366 et seq, Verlag Urban & Schwarzenberg, Munich-Berlin 1957, and in "Encydopedia of Polymer Science and Technology", Vol. 3, P. 705 to 730, John Wiley, N.Y. 1965.

The polymer obtained by copolymerisation has a high molecular weight and can hardly be processed with conventional equipment on account of its very poor plasticity.

The molecular weight can be reduced and the desired plasticity can thereby be achieved by suitable compounds which are present during polymerisation or which are added to the latex subsequent to polymerisation. These technics are described, for example, in U.S. Pat. Nos. 35 07 825, 22 64 173, 33 78 538, 33 97 173, in German Offenlegungsschriften Nos. 21 34 158, 20 18 736, 22 13 116, 20 03 147, 19 11 439, 18 07 298, 22 41 394, in French Patent Nos. 14 57 004 and 14 80 110, and in the British Patent No. 9 59 122.

In the two-stage processes, a latex is firstly produced, whose polymer is adjusted to the desired viscosity in the second stage by addition of a peptisation agent, such as tetraethylthiuram disulphide (TETD).

This process for the production of sulphur-modified polychloroprene types with stable viscosity and which are stable in storage is described, for example, in DE-OS 22 18 152, DE-OS 22 13 116, DE-OS 20 03 147 and GB-12 19 782.

DE-OS 20 18 736 also describes a process in which TETD in conjunction with dibutylamine is added to the latex on completion of polymerisation. The amine serves to accelerate peptisation.

DE-OS 20 03 147 describes a process in which the presence of water-soluble tertiary amines favourably influences polymerisation. In the above processes a highly polymeric polychloroprene is produced which is analytically difficult to characterise and thus makes the subsequent peptisation process erratic and difficult to reproduce.

There have been many attempts to produce sulphur-modified polychloroprene having a favourable range of viscosity directly in a one-stage process.

In this process, the desired plasticity is adjusted using so-called regulators, such as xanthogen disulphides, iodoform or $C_8$–$C_{20}$alkylmercapatans. These processes are described, for example, in U.S. Pat. Nos. 33 78 538, 33 97 173, FR-14 57 004 and in DE-OS 19 11 439.

Good results have hitherto been achieved, according to DE-PS 26 45 920, by adding a secondary and/or tertiary aliphatic amine having unbranched and/or cyclic alkyl chains with from 2 to 18 carbon atoms in a quantity of from 0.01 to 1 parts by weight per 100 parts by weight of monomers and optionally a tertiary aliphatic water-soluble amine having hydroxy groups in a quantity of up to 0.45 parts by weight per 100 parts by weight of monomers to the monomers to be polymerised, adding tetraethylthiuram disulphide either in a quantity of from 0.05 to 1.0 parts by weight per 100 parts by weight of monomers to the polymerisation mixture after a monomer reaction of at least 5% and at most 25%, or adding tetraethylthiuram disulphide in a partial quantity of from 0.05 parts by weight to 0.40 parts by weight to the mixture before commencement of polymerisation and adding specific emulsifiers or emulsifier mixtures.

This known process requires a large number of additional chemicals which have to be added in quite specific quantities and at definite times during polymerisation, although they are not advantageous for the finished rubber in which they remain and are possibly even disadvantageous depending on the field of use.

Thus, an object of the present invention was to provide a process for the production of sulphur-modified polychloroprene which eliminates a subsequent peptisation stage and the disadvantages of the known process.

BRIEF DESCRIPTION OF THE INVENTION

It has now surprisingly been found that this object can be achieved by carrying out the common polymerisation of chloroprene and sulphur in the presence of dithiocarbamates an/or xanthogenates and metering in the activator continuously or batchwise over the duration of polymerisation.

DETAILED DESCRIPTION

Carrying out polymerisation in the presence of dithiocarbamates in surprising in so far as these compounds, particularly when combined with elementary sulphur, are exceptionally effective stopping agents for emulsion polymersation (D. C. Blackley, Emulsion Polymerisation, Theory and Practice, Applied Science Publishers Ltd., London 1975, P. 406–416), and are also used as stopping agents in the emulsion polymerisation of chloroprene in the absence of sulphur additives (FR-1 480 110).

Thus, the subject of the present invention is a process for the production of gel-free, toluene-soluble, sulphur-modified polychloroprene by emulsion polymerisation of chloroprene, sulphur and optionally further monomers which are copolymerisable with chloroprene and sulphur using a peroxy activator and subsequent working-up by stopping, stabilising, degassing and isolating without separate peptisation, characterised in that polymerisation is carried out in the presence of dithiocarbamates and/or xanthogenates and the activator is metered in continuously or batch-wise during the course of polymerisation.

The polychloroprene is produced as liquid rubber, preferably commencing with a Brookfield viscosity of 30 000 cP at 21° C., or solid rubber, preferably having up to a Mooney viscosity (ML 1+4; 100° C.) of 120 ME.

Suitable polychloroprene rubbers are those which contain up to 20% by weight of other monomers, such as 2,3-dichlorobutadiene, 1-chlorobutadiene, butadiene, isoprene, acrylic acid, methacrylic acid, acrylonitrile or methacrylonitrile, preferably up to 10% by weight of 2,3-dichlorobutadiene polymerised therein.

Sulphur is preferably used in quantities of from 0.05 to 1.0% by weight, based on monomer, particularly from 0.25 to 0.7% by weight, preferably as an aqueous dispersion.

Corresponding quantities of conventional sulphur donors can also be used instead of sulphur.

Suitable activators are, for example, persulphates, perborates, percarbonates, perphosphates and $H_2O_2$, preferably water-soluble salts of peroxodisulphuric acid. The activators are preferably used in a molar quantity corresponding to from 0.03 to 0.7% by weight, particularly from 0.1 to 0.6% by weight, based on monomer, of potassium peroxodisulphate.

Suitable agents for stopping polymerisation are, for example, pyrocatechin and particularly diethylhydroxylamine which is particularly used in a quantity of from 0.05 to 0.15% by weight, based on monomer, preferably in the form of an aqueous solution.

Usual stabilizing agents like sterically hindered phenole derivatives, amines, phosphites, xanthogene disulfides or tetraalkylthiurame disulfides are preferably added to the polymer to improve the stability in storage thereof. Particularly preferred are Tetraalkylthiuram disulphides, particularly the tetraethyl compound (TETD) or xanthogen disulphides, particularly diisopropylxanthogen disulphide or 2,2-(2,4-dioxapentamethylene)-n-butyl-xanthogen disulphide. The addition is in the form of an aqueous dispersion, organic solution or aqueous emulsion of the organic solution to the latex. Up to 6% by weight of TETD, based on monomer, or a corresponding molar quantity of another compound is used.

Suitable dithiocarbamate anions correspond to the formula

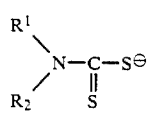

suitable xanthogenate anions correspond to the formula

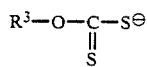

wherein $R_1$, $R_2$ and $R_3$ represent an optionally substituted alkyl, cycloalkyl or aryl radical, $R_1$ and $R_2$ canalso form a ring together with the nitrogen atom and the cyclic substituents can contain hetero atoms.

The dithiocarbamates and xanthogenates are preferably used in the form of their alkali metal salts, particularly sodium or potassium salts.

$R_1$ and $R_2$ preferably represent $C_1$-$C_4$ alkyl, $R_3$ preferably represents $C_1$-$C_8$ alkyl or 2,2-(2,4-dioxapentamethylene)-n-butyl.

From 0.05 to 5.0, particularly from 0.1 to 3.0% by weight of sodium dibutyldithiocarbamate, based on monomer, or a corresponding molar quantity of another dithiocarbamate or from 0.1 to 5.0, particularly from 0.5 to 3.0% by weight of potassium ethyl xanthogenate, based on monomer, or a corresponding molar quantity of another xanthogenate is preferably used.

An important aspect of this process is the production of gel-free (gel content ≦2% by weight) chloroprene polymers in a wide range of viscosity.

The viscosity depends on the quantity of sulphur and on the quantity of dithiocarbamate and xanthogen respectively.

Figure 1:
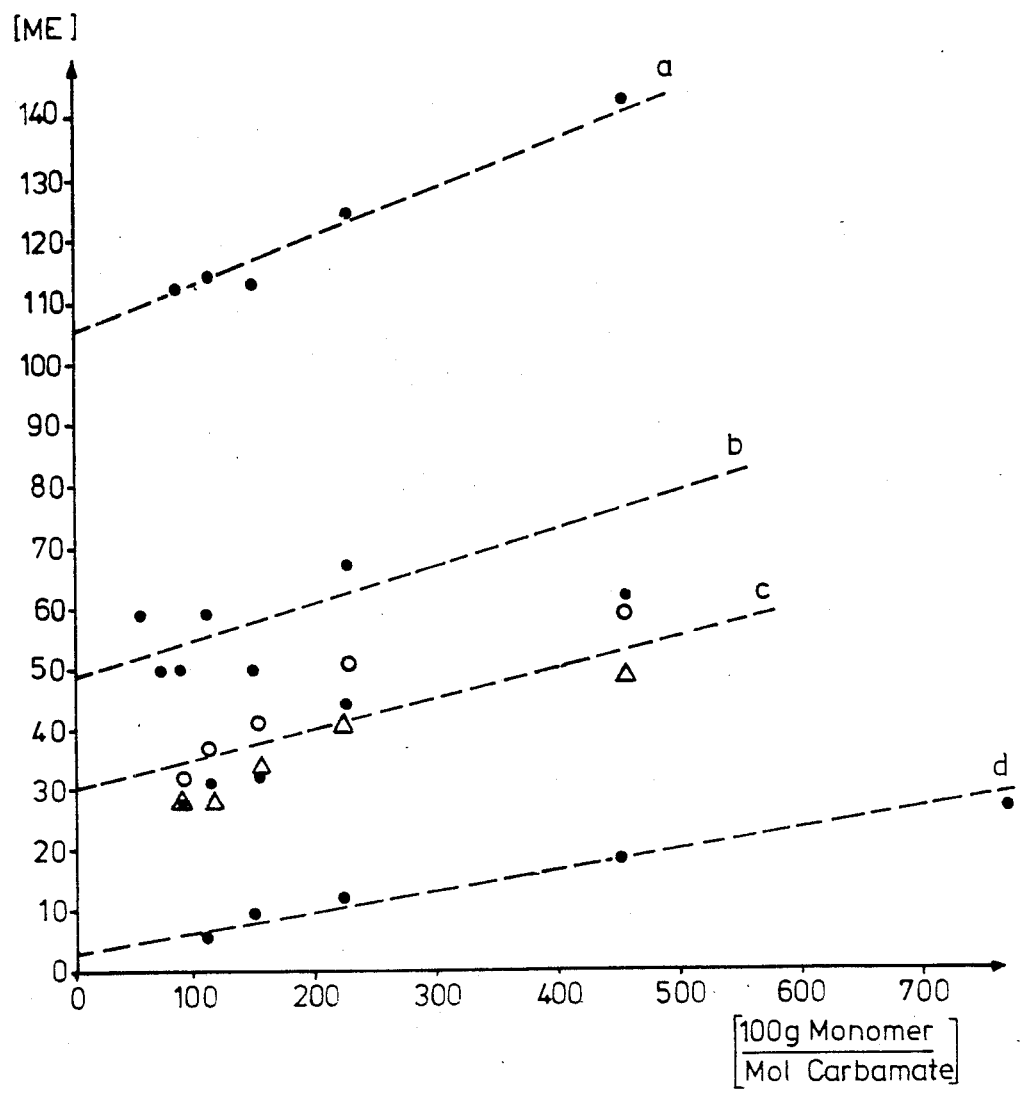
FIG. 1 and FIG. 2 graphically illustrate the effects on Mooney viscosity of the solid rubber with by quantities of dithiocarbomate and sulphur used.

FIG. 1 shows the dependence of the Mooney viscosity ML 1+4, 100° C. of the solid rubber on the quantities of dithiocarbamate and sulphur used for a polymerisation temperature of 45° C., a polymerisation reaction of 65% and an addition of 1% by weight of TETD, based on the quantity of monomer. The reciprocal quantities of dithiocarbamate in [1/mol] for different quantities of sulphur (a=0.1 g S, b=0.2 g S, c=0.3 g S, d=0.6 g S), in each case based on a quantity of 100 g of monomer are shown in relation to the Mooney viscosity (ME). • represents dibutyl, o represents diethyl and Δ represents dimethyl dithiocarbamate.

The results can be shown clearly by straight lines. The axis intercepts of these straight lines at ME have a linear dependency on the reciprocal quantity of sulphur used during polymerisation.

Figure 2:
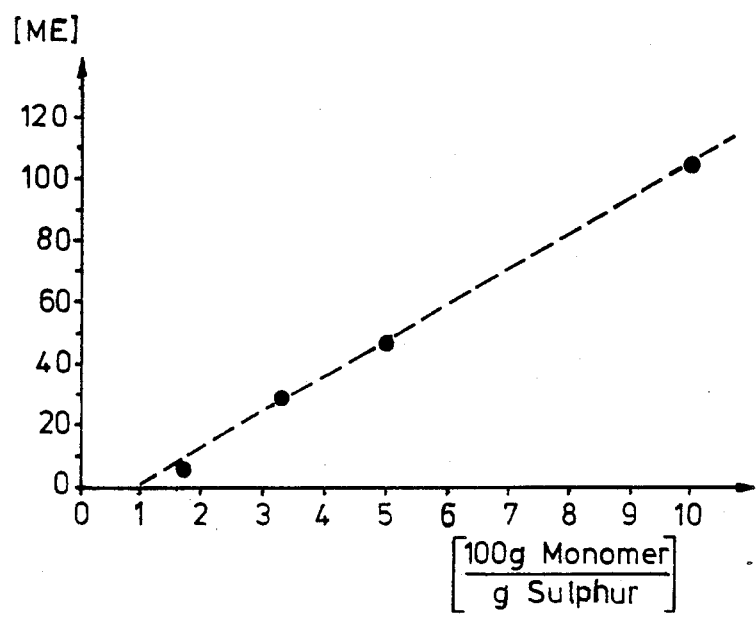

This is shown in FIG. 2.

Owing to these empirically determined dependencies those skilled in the art can determine the quantity of dithiocarbamate or xanthogenate necessary for the desired Mooney viscosity for parameters other than those shown in FIGS. (1) and (2) (quantity of sulphur, polymerisation reaction, polymerisation temperature, type and quantity of dithiocarbonate or xanthogenate, type and quantity of thiuram disulphide or xanthogen disulphide addition etc.)

EXAMPLES

The experiments in the series (1) to (5) and in part (6) are based on the following basic contents (batch experiments, quantities given in parts by weight):

| | |
|---|---|
| Chloroprene and comonomer: | 100 |
| Desalinated water (total): | 125 ± 5 |
| Disproportionated abietic acid: | 3.5 |
| Na-salt of condensation product consisting of naphthalene sulphonic acid and formaldehyde: | 0.7 |
| KOH: | 0.5 |
| $K_2S_2O_8$: | 0.05–0.63 |
| Na-salt of anthraquinone sulphonic acid | 0.03 |
| Sulphur: | 0.1–0.6 |
| Peptisation agent: | c.f. Tables |

The experiments described in the series (1)–(6) are carried out in a 2 l flask. The aqueous phase consisting of 116 parts by weight of desalinated water, disproportionated abietic acid, KOH and a Na-salt of the condesation product of naphthalene sulphonic acid and formaldehyde is placed in this vessel, flushed with nitrogen and heated to a temperature of 45° C. The monomer which has been flushed with nitrogen is then added. After adjustment to a temperature of 45° C., the sulphur is added as a 50% by weight aqueous dispersion. The sulphur dispersion contains, based on dispersion, 0.9% by weight dispersant, 0.08% by weight ZnO and 0.1% by weight MgO. The peptisation agent is then added as an aqueous solution or as an aqueous emulsion of a toluic solution.

The solution is activated with 0.03 parts by weight of $K_2S_2O_8$ in the form of a 2% by weight aqueous $K_2S_2O_8$ solution which has been flushed with nitrogen. During the experiment $2.25 \times 10^{-3}$ parts by weight per minute of $K_2S_2O_8$ in the form of this aqueous persulphate solution which has been flushed with nitrogen are metered in. The quantities of persulphate required in each case to achieve the given reactions are also given in the Tables. The total quantity of water results from the original quantity of water used and the aqueous solutions or dispersions of the chemicals.

Unless otherwise indicated in the Tables, polymerisation is carried out at a temperature of 45° C. under nitrogen. In the Examples of series (2b) polymerisation is carried out in the presence of oxygen and this is compared with polymerisation in the absence of oxygen. The reaction is carried out gravimetrically or using density measurements. In the various experiments, the reactions given in Tables (1)–(5) are stopped with 0.03 parts by weight, based on latex, of an aqueous 2.5% by weight solution of diethylhydroxyl amine and the latex is mixed with 1.0 parts by weight of tetraethylthiuram disulphide, (TETD). TETD is used in the form of a toluic emulsion.

The latex is degassed to about 500 ppm residual chloroprene (based on latex), the degassed latex is adjusted to pH 6.5 with 20% by weight acetic acid, the polymer is isolated by freeze coagulation, washed with desalinated water, the sheet is drained with a press-roller to about 30% by weight residual moisture and is dried in a recirculating air drying chamber at 70° C. until it has a residual moisture of $\leq 0.5\%$ by weight.

The changed consituents or changes in carrying out the experiments in series (6) and 70 compared with experiments (1)–(5) are given in the corresponding Tables.

The continuous polymerisation is carried out in a 5 vessel cascade. The residence time in each of the five equally large vessels is 0.5 h. Monomer, aqueous phase and activator are in each case metered into the first reactor in three separate streams.

The individual phases of the continious polymerisation are made up as follows:

Monomer phase:

| Chloroprene (CP) and | c.f. Tab. (6) and (7) |
|---|---|
| 2,3-dichlorobutadiene (DCB): | c.f. Tab. (6) and (7) |
| Phenothiazine: | 0.01 |

Aqueous phase:

| Desalinated water: | 110 |
|---|---|
| Disproportionated Abietic acid: | 3.5 |
| KOH: | 0.5 |
| Sodium salt of the condensation product of naphthalene sulphonic acid and formaldehyde: | 0.7 |
| Sodium salt of anthraquinone sulphonic acid: | 0.06 |
| Sulphur: | c.f. Tab. (6) and (7) |

| Peptisation agent: | c.f. Tab. (6) and (7) |
|---|---|

Activator solution

| Potassium peroxodisulphate: | from 0.15 to 0.55 metered in as a 1.2% by weight aqueous solution |
|---|---|

The activator is metered in separately into vessels (1) to (4). The distribution of the polymerisation reaction over the individual vessels and the final reaction could be adjusted by means of the quantity of persulphate. Two Examples are given to fix final reactions of 65% and 85%:

| Vessel No. | $K_2S_2O_8$ meterage | Total reaction [%] | $K_2S_2O_8$ meterage | Total reaction [%] |
|---|---|---|---|---|
| 1 | 0.05 | 35 | 0.1 | 40 |
| 2 | 0.04 | 48 | 0.06 | 60 |
| 3 | 0.04 | 57 | 0.05 | 73 |
| 4 | 0.04 | 63 | 0.05 | 82 |
| 5 | — | 65 | — | 85 |

TEDTD is metered in as a 15% by weight cloroprenic solution into the 5th vessel of the cascade.

In a separate agitator vessel polymerisation is continuously stopped with 0.1 parts by weight of diethylhydroxyl amine.

The latex which has been polymerised in a continuous manner is degassed and worked up as described in the case of the batch experiments.

The batch experiments given in Table (7) are carried out like the experiments given in Tables (1) to (5). A 250 l reactor is used instead of the 2 l vessel.

The following measurements were carried out on the crude rubber:

In order to determine the gel content, from 100 to 150 mg of polymer were left to stand for from 12 to 16 hours in 20 cm³ of toluene and were then agitated for 2 hours. After the insoluble portion had been centrifuged off, it was dried, weighted and given as a percentage of the weight of polymer.

The Mooney viscosity (ML 1+4) is determined according to DIN 53 523 part 1–3 at 100° C.

The Mooney stability after hot air ageing ($\Delta$ ML) is determined as the difference in the Mooney values of rolled sheets subsequent to and prior to from 24 to 72 hour storage at 70° C. In the case of positive signs, the Mooney viscosity rises after hot air ageing and vice versa.

Vulcanisations are carried out on the basis of two mixtures.

Mixture 1 (Iso-mixture 2475)
100.0 parts by weight of polymer
0.5 parts by weight of stearic acid
2.0 parts by weight of phenyl-$\beta$-naphthylamine
30.0 parts by weight of carbon black (N 762)
4.0 parts by weight of magnesium oxide
5.0 parts by weight of active zinc oxide Mixture 2:
100.0 parts by weight of polymer
75.0 parts by weight of carbon black (N 762)
10.0 parts by weight of polyether polythioether 2.0 parts by weight of styrenised diphenyl amine
0.5 parts by weight of N-isopropyl-N'-phenyl-p-phenylene-diamine
0.5 parts by weight of stearic acid
4.0 parts by weight of paste-like magnesium oxide
5.0 parts by weight of zinc oxide The Mooney scorch (MS) is determined at a temperature of 120° C. according to DIN 53523, part 4.

The tensile strength, elongation at break and modulus at 200% and 300% elongation of the vulcanisate is determined after a vulcanisation time of 30 min according to DIN 53 504.

The modulus of mixture 1 is determined at 300% elongation and that of mixture 2 at 200% elongation.

The dynamic properties are evaluated according to de Mattia (DIN 53 522, part 2), before and after hot air ageing at 100° C. for 7 days. It is evaluated according to cracking stage 3.

The further tearing strength is determined on the standard ring R 2 according to DIN 53 504. To this end, the inside of the ring is provided with 2×5 adjacent 1 mm deep grooves. The spacing of the grooves is 2 mm. The two groups of 5 grooves lie opposite one another.

The notched rings are placed on rollers having the dimensions for a standard ring R 2, c.f. DIN 53 504, Table 3, and with a rate of feed of 700 mm/min are stressed in a tensile strength machine up to a tension at which they break.

The tear propagation resistance W or the structural strength is converted according to the following equation to the target thickness of $d_0 = 4$ mm and is given in N.

$$W = W_{det} \frac{d}{d_0}$$

wherein
W [N] = required tear propagation resistance
$W_{det}$ [N] = determined tear propagation resistance
$d_o$ [mm] = target thickness
d [mm] = determined thickness The average value is calculated from the measured values of 3 or 6 tests, as is the assigned confidence interval for 95% safety, c.f. DIN 53 598.

Results of the experiments nos. (1) to (7)

Series (1) This series shows the direct peptisation according to the invention with dimethyl(DMDTC)- and diethyl-dithiocarbamate (DEDTC) is possible. The Mooney value is successfully adjusted via the quantity of dithiocarbamate. The Mooney values of gel-free products (<2%) lie within the range of 28 to 68 ME. It is favourable to have a TETD addition for adjustment to good Mooney stabilities (+5 to −5).

Series (2a) This series shows that direct peptisation according to the invention with dibutyldithiocarbamate (DBDTC) is possible. The Mooney value is successfully adjusted via the quantity of DBDTC with different quantities of sulphur.

Series (2b) These experiments show that direct peptisation, being carried out during polymerisation, is also possible according to the invention in the presence of oxygen. Inhibition time and gross polymerisation speed of polymerisation are scarcely affected.

Series (3) This shows that adjustment to good Mooney stabilities in products which are produced with DBDTC by direct peptisation according to the present invention is possible with TETD additions.

Series (4) This series shows that direct peptisation according to the invention is possible with dithiocarvamates corresponding to the general formula:

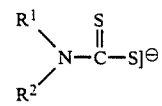

Moreover, direct peptisation according to the invention using xanthogenates is also possible.

Series (5) This series shows that the production of gel-free products (2) within a wide reaction range of from 18% to 90% is possible. The Mooney value can also be adjusted by means of the quantity of dithiocarbamate in the case of reactions of 90%.

Series (6) The experiments summarized in this series show the following:
  direct peptisation according to the invention is also possible in the presence of comonomers
  the precess can be used within a wide range of temperature
  TETD additions can be varied within a wide range to adjust to mooney-stable products
  polymerisation can be carried out continuously or discontinuously.

Series (7) The experiments summarized in this series show that the applicational properties of the products are at least equal to prior art in relation to Mooney stability, mastication, Mooney scorch and the vulcanisate values (elongation at break, tearing strength, modulus, tear propagation resistance and the dynamic properties according to de Mattia).

| Series (1) Direct peptisation with dimethyl-(DMDTC)-and diethyl-dithiocarbamate (DEDTC) | | | | | | | | |
|---|---|---|---|---|---|---|---|---|
| Sulphur | Type of carbamate Na-salts | Quantity | $K_2S_2O_8$ | Monomer reaction [%] | TETD addition | Gel content [% by weight] | ML 1 + 4 [ME] | ΔML (24 h) [ME] |
| 0.3 | DMDTC | 1.58 | 0.58 | 65 | — | 0.5 | 48 | +7 |
| " | DMDTC | 1.26 | 0.58 | 63 | — | 1.0 | 69 | +22 |
| " | DMDTC | 0.95 | 0.63 | 67 | — | 11 | 116 | +17 |
| " | DMDTC | 0.63 | 0.54 | 65 | — | 37 | 157 | +3 |
| " | DMDTC | 0.32 | 0.53 | 63 | — | 50 | 154 | >+46 |
| " | DMDTC | 1.58 | 0.65 | 64 | 1.0 | 0.1 | 28 | +2 |
| " | DMDTC | 1.26 | 0.59 | 63 | 1.0 | 0.2 | 28 | ±0 |
| " | DMDTC | 0.95 | 0.53 | 63 | 1.0 | 0.1 | 34 | −2 |
| " | DMDTC | 0.63 | 0.55 | 65 | 1.0 | 0.3 | 41 | ±0 |
| " | DMDTC | 0.32 | 0.49 | 61 | 1.0 | 1.1 | 49 | −1 |
| 0.3 | DEDTC | 1.88 | 0.49 | 63 | — | 0.9 | 43 | +2 |
| " | DEDTC | 1.51 | 0.44 | 63 | — | 0.8 | 55 | +4 |
| " | DEDTC | 1.13 | 0.28 | 59 | — | 8 | 133 | +3 |
| " | DEDTC | 0.75 | 0.31 | 64 | — | 24 | 152 | −3 |

Series (1) Direct peptisation with dimethyl-(DMDTC)-and diethyl-dithiocarbamate (DEDTC) -continued

| Sulphur | Type of carbamate Na-salts | Quantity | $K_2S_2O_8$ | Monomer reaction [%] | TETD addition | Gel content [% by weight] | ML 1 + 4 [ME] | ΔML (24 h) [ME] |
|---|---|---|---|---|---|---|---|---|
| " | DEDTC | 0.38 | 0.35 | 65 | — | 30 | 151 | +6 |
| 0.3 | DEDTC | 1.88 | 0.51 | 66 | 1.0 | 0.1 | 32 | −2 |
| " | DEDTC | 1.51 | 0.51 | 69 | 1.0 | 0.1 | 37 | −4 |
| " | DEDTC | 1.13 | 0.29 | 62 | 1.0 | 0.2 | 41 | −3 |
| " | DEDTC | 0.75 | 0.32 | 65 | 1.0 | 0.3 | 51 | −1 |
| " | DEDTC | 0.38 | 0.30 | 66 | 1.0 | 0.4 | 59 | +2 |

Series (2a) Direct peptisation with dibutyldithiocarbamate

| Sulphur | DBDTC | $K_2S_2O_8$ | Monomer reaction [%] | TETD addition | Gel content [% by weight] | ML 1 + 4 [ME] | ML (24 h) [ME] |
|---|---|---|---|---|---|---|---|
| 0.1 | 2.5 | 0.15 | 69 | 1.0 | 6 | 113 | −13 |
| " | 2.0 | 0.15 | 69 | 1.0 | 6 | 114 | −11 |
| " | 1.5 | 0.12 | 66 | 1.0 | 5 | 113 | −13 |
| " | 1.0 | 0.11 | 66 | 1.0 | 9 | 124 | −11 |
| " | 0.5 | 0.12 | 69 | 1.0 | 31 | 143 | −10 |
| 0.2 | 4.0 | 0.24 | 69 | 1.0 | 0.5 | 59 | +1 |
| " | 3.0 | 0.20 | 64 | 1.0 | 0.7 | 50 | +3 |
| " | 2.5 | 0.20 | 63 | 1.0 | 0.5 | 50 | +6 |
| " | 2.0 | 0.22 | 65 | 1.0 | 0.8 | 59 | +3 |
| " | 1.5 | 0.19 | 67 | 1.0 | 0.6 | 50 | +4 |
| " | 1.0 | 0.17 | 66 | 1.0 | 1.0 | 67 | +4 |
| 0.3 | 2.5 | 0.24 | 63 | 1.0 | 0.1 | 28 | +4 |
| " | 2.0 | 0.23 | 64 | 1.0 | 0.1 | 31 | +3 |
| " | 1.5 | 0.20 | 69 | 1.0 | 0.2 | 32 | +2 |
| " | 1.0 | 0.18 | 65 | 1.0 | 0.4 | 44 | +5 |
| 0.3 | 0.5 | 0.16 | 66 | 1.0 | 0.9 | 62 | −4 |
| 0.6 | 2.0 | 0.39 | 63 | 1.0 | 0.1 | 6 | +1 |
| " | 1.5 | 0.39 | 66 | 1.0 | 0.1 | 9 | +4 |
| " | 1.0 | 0.28 | 69 | 1.0 | 0.2 | 12 | +3 |
| " | 0.5 | 0.23 | 68 | 1.0 | 0.1 | 19 | +1 |
| " | 0.4 | 0.21 | 66 | 1.0 | 0.3 | 19 | +1 |
| " | 0.3 | 0.21 | 70 | 1.0 | 0.2 | 27 | +2 |
| " | 0.2 | 0.14 | 63 | 1.0 | 0.5 | 35 | ±0 |
| " | 0.1 | 0.15 | 64 | 1.0 | 0.5 | 26 | −4 |

Series (2b) Direct peptisation and polymerisation with dibutyldithiocarbamate (DBDTC) in the presence of oxygen

| Sulphur | DBDTC | $K_2S_2O_8$ | Oxygen mg/l | Monomer reaction [%] | Inhibition time [min] | Gross polymerisation speed [Mol · cm$^3_{wp}$sec$^{-1}$] | ML 1 + 4 |
|---|---|---|---|---|---|---|---|
| 0.3 | 1.0 | 0.23 | — | 79 | 1 | 1.1 | 53 |
| 0.3 | 1.0 | 0.35 | Saturation of the aqueous phase with air at room temperature | 76 | 1 | 0.9 | 41 |

Series (3) TETD stabilisation with the use of DBDTC as a direct peptisation agent

| Sulphur | DBDTC | $K_2S_2O_8$ | Monomer reaction [%] | TETD addition | Gel content [% by weight] | ML 1 + 4 [ME] | ΔML (24 h) [ME] |
|---|---|---|---|---|---|---|---|
| 0.3 | 2.5 | 0.27 | 60 | — | 0.9 | 74 | +18 |
| " | 2.0 | 0.37 | 62 | — | 1.8 | 87 | +17 |
| " | 1.5 | 0.22 | 68 | — | 1.5 | 59 | +19 |
| " | 1.0 | 0.21 | 63 | — | 2.3 | 70 | +20 |
| " | 2.5 | 0.27 | 64 | 1.0 | 0.3 | 22 | +2 |
| " | 2.5 | 0.24 | 63 | " | 0.4 | 28 | +4 |
| " | 2.0 | 0.26 | 67 | " | 0.3 | 25 | +2 |
| " | 2.0 | 0.23 | 64 | " | 0.6 | 31 | +3 |

-continued

| Series (3) TETD stabilisation with the use of DBDTC as a direct peptisation agent | | | | | | | |
|---|---|---|---|---|---|---|---|
| Sulphur | DBDTC | $K_2S_2O_8$ | Monomer reaction [%] | TETD addition | Gel content [% by weight] | ML 1 + 4 [ME] | ΔML (24 h) [ME] |
| " | 1.5 | 0.22 | 69 | " | 0.3 | 33 | +4 |
| " | 1.5 | 0.20 | 69 | " | 0.5 | 32 | +2 |
| " | 1.0 | 0.18 | 68 | " | 0.5 | 36 | +4 |
| " | 1.0 | 0.18 | 65 | " | 0.5 | 44 | +5 |
| " | 0.5 | 0.17 | 68 | " | 0.6 | 52 | −2 |
| " | 0.5 | 0.16 | 66 | " | 1.0 | 62 | −4 |

| | Peptisation agent | | | Monomer reaction [%] | TETD addition | Gel content [% by weight] | ML 1 + 4 [ME] | Δ ML (24 h) [ME] |
|---|---|---|---|---|---|---|---|---|
| Sulphur | Type | Quantity | $K_2S_2O_8$ | | | | | |
| Direct peptisation with various dithiocarbamates and xanthogenates | | | | | | | | |
| 0.3 | Na-bis-2-ethyl-hexyl-dithio-carbamate | 1.27 | 0.48 | 65 | 1.0 | 0.5 | 41 | +8 |
| 0.3 | Na-dicyclo-hexyldithio-carbamate | 1.04 | 0.53 | 65 | 1.0 | 0.8 | 59 | −1 |
| 0.3 | K-ethyl-xanthogenate | 2.0 | 0.09 | 64 | 1.0 | 0.3 | 37 | +5 |
| " | | 1.0 | 0.08 | 66 | 1.0 | 0.5 | 60 | +14 |
| " | | 0.5 | 0.07 | 64 | 1.0 | 0.9 | 64 | +18 |
| " | | 1.5 | 0.08 | 67 | 1.0 | 1.2 | 61 | +8 |
| " | | 1.5 | 0.08 | 65 | 3.0 | 0.8 | 37 | +2 |
| Direct peptisation with various dithiocarbamates, xanthogenates and Na-salt of mercaptobenzthiazole | | | | | | | | |
| 0.3 | Na-2,2-(2,4-dioxopenta-methylene)-n-butyl-xantho-genate* | 2.5 | 0.55 | 63 | 1.0 | 1.5 | 72 | +10 |
| | | 1.0 | 0.19 | 68 | 1.0 | 0.8 | 59 | +11 |
| | | 0.5 | 0.13 | 67 | 1.0 | 0.6 | 56 | +8 |

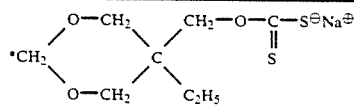

*

| Series (5) Reaction variation in direct peptisation with dibutyldithiocarbamate | | | | | | | |
|---|---|---|---|---|---|---|---|
| Sulphur | DBDTC | $K_2S_2O_8$ | Monomer reaction [%] | TETD addition | Gel content [% by weight] | ML 1 + 4 [ME] | ΔML (24 h) [ME] |
| 0.3 | 1.0 | 0.05 | 18 | 1.0 | 0.8 | 8 | — |
| 0.3 | 1.0 | 0.07 | 32 | 1.0 | 0.5 | 34 | — |
| 0.3 | 1.0 | 0.08 | 41 | 1.0 | 1.7 | 38 | — |
| 0.3 | 1.0 | 0.12 | 51 | 1.0 | 1.7 | 41 | — |
| 0.3 | 1.0 | 0.15 | 60 | 1.0 | 2.2 | 55 | — |
| 0.3 | 1.0 | 0.21 | 69 | 1.0 | 1.5 | 58 | — |
| 0.5 | 0.2 | 0.05 | 19 | 1.0 | 0.1 | 19 | — |
| 0.5 | 0.2 | 0.09 | 47 | 1.0 | 0.2 | 27 | — |
| 0.5 | 0.2 | 0.12 | 57 | 1.0 | 0.2 | 40 | — |
| 0.5 | 0.2 | 0.14 | 63 | 1.0 | 0.2 | 41 | — |
| 0.5 | 0.2 | 0.17 | 70 | 1.0 | 0.7 | 73 | — |
| 0.5 | 0.2 | 0.21 | 80 | 1.0 | 1.0 | 65 | — |
| 0.3 | 0.5 | 0.26 | 80 | 1.0 | 0.2 | 62 | +4 |
| 0.3 | 1.0 | 0.28 | 80 | 1.0 | 0.2 | 44 | +3 |
| 0.3 | 1.5 | 0.33 | 80 | 1.0 | 0.2 | 35 | +4 |
| 0.3 | 2.0 | 0.33 | 80 | 1.0 | 0.1 | 35 | +1 |
| 0.3 | 1.0 | 0.43 | 90 | 1.0 | 3.2 | 62 | +1 |
| 0.3 | 1.5 | 0.38 | 90 | 1.0 | 2.1 | 55 | +3 |
| 0.3 | 2.0 | 0.39 | 90 | 1.0 | 0.7 | 47 | +7 |

Series (6) Direct peptisation using various dithiocarbamates in discontinuous and continuous processes

| Discontinuous | Continuous | Peptisation agent Qty | Type | Monomer CP | DCB | Sulphur | Temp [°C.] | $K_2S_2O_8$ | Monomer reaction | TETD add. | ML 1 + 4 [ME] | ΔML (24 h) [ME] | (72 h) [ME] |
|---|---|---|---|---|---|---|---|---|---|---|---|---|---|
| X | — | 3.0 | DBDTC | 100 | — | 0.2 | 45 | 0.20 | 64 | 1.0 | 50 | +3 | — |
| X | — | 0.2 | DBDTC | 100 | — | 0.6 | 45 | 0.14 | 63 | 1.0 | 35 | ±0 | — |
| X | — | 1.9 | DEDTC | 100 | — | 0.3 | 45 | 0.49 | 63 | — | 43 | +2 | — |
| X | — | 1.1 | DEDTC | 100 | — | 0.3 | 45 | 0.29 | 62 | 1.0 | 41 | −3 | — |
| X | — | 0.3 | DMDTC | 100 | — | 0.3 | 45 | 0.49 | 61 | 1.0 | 49 | −1 | — |
| — | X | 0.46 | DBDTC | 98.8 | 1.2 | 0.5 | 30 | 0.16 | 68 | 1.0 | 59 | −5 | −6 |
| — | X | 0.45 | DBDTC | 97.0 | 3.0 | 0.5 | 30 | 0.16 | 65 | 1.0 | 37 | −3 | −2 |
| — | X | 0.81 | DBDTC | 98.8 | 1.2 | 0.5 | 45 | 0.54 | 85 | 1.5 | 41 | −2 | −3 |
| — | X | 0.56 | DBDTC | 98.8 | 1.2 | 0.5 | 10 | 0.55 | 50 | 1.0 | 35 | −3 | −6 |
| — | X | 2.5 | DBDTC | 100 | — | 0.3 | 45 | 0.45 | 90 | 2.0 | 47 | −1 | −4 |

Series (7) Production conditions of samples (a) to (f)

| Experiment | Discontinuous (2501) | Continuous | Peptisation agent | | Monomer CP | DCB | Sulphur | Temp. [°C.] | $K_2S_2O_8$ | Monomer reaction [%] | TETD addition |
|---|---|---|---|---|---|---|---|---|---|---|---|
| (a) | | X | 1.2 | DBDTC | 98.8 | 1.2 | 0.3 | 40 | 0.13 | 63 | 3.0 |
| (b) | | X | 0.35 | DBDTC | 98.8 | 1.2 | 0.5 | 45 | 0.13 | 67 | 1.0 |
| (c) | | X | 1.8 | DBDTC | 98.8 | 1.2 | 0.3 | 45 | 0.32 | 85 | 3.0 |
| (d) | X | | 1.0 | DBDTC | 98.8 | 1.2 | 0.3 | 40 | 0.13 | 65 | 1.5 |
| (e) | X | | 1.5 | DECTC | 98.8 | 1.2 | 0.3 | 45 | 0.20 | 65 | 3.0 |
| (f) | | X | 3.5 | DBDTC | 98.8 | 1.2 | 0.3 | 45 | 0.54 | 90 | 3.0 |

Series (8) Applicational properties of samples (a) to (f)

| Experiment | ML 1 + 4 [ME] | ML (24 h) [ME] | (72 h) [ME] | Mixture No. | Mixture Mooney [ME] | MS-5 [min] | Tensile strength [mPa] | Elongation at break [%] | M [mPa] at 300% elongation (at 200% elongation) | Further tearing strength [N] | Dyn. values o-value [KZ] | (DeMattia) acc. to HLA [KZ] |
|---|---|---|---|---|---|---|---|---|---|---|---|---|
| a | 61 | −5 | — | 1 | 74 | 21 | 20.0 | 755 | 7.0 | 235 | — | >500 |
| b | 35 | −3 | — | 1 | 54 | 27 | 20.5 | 605 | 8.9 | 204 | — | >500 |
| c | 37 | −4 | −7 | 2 | 42 | — | 15.0 | 390 | (8.2) | 212 | 425 | >500 |
| d | 48 | +8 | — | 1 | 69 | 25 | 22.2 | 675 | 8.2 | 235 | — | >500 |
| e | 41 | −2 | −3 | 1 | 57 | — | 19.0 | 620 | 8.0 | — | — | >500 |
| f | 51 | −4 | −8 | 2 | 52 | 18 | 15.1 | 420 | (8.1) | 210 | 500 | >500 |

We claim:

1. A process for the production of toluene-soluble, sulphur-modified polychloroprene by emulsion polymerization of chloroprene, 0.05 to 1% by weight sulphur and up to 20% by weight of further monomers which are copolymerizable with chloroprene and sulphur selected from the group consisting of 2,3-dichlorobutadiene, 1-chlorobutadiene, butadiene, isoprene, acrylic acid, methacrylic acid, acrylonitrile and methacylonitrile, using a peroxy activator and subsequent working-up by stabilizing, stopping, degassing and isolating without separate peptization, characterised in that polymerization is carried out in the presence of dithiocarbamates or xanthogenates and the activator is metered in continuously or batch-wise during the course of polymerization, wherein said dithiocarbamates have an anion of the formula

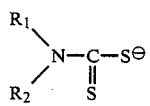

and the xanthogenates have an anion of the formula

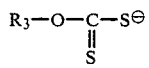

wherein $R_1$, $R_2$ and $R_3$ are each independent of one another unsubstituted or substituted alkyl, cycloalkyl or aryl, or $R_1$ and $R_2$ together form a ring structure with the nitrogen atom to which they are bonded.

2. A process according to claim 1, characterised in that the toluene-soluble, sulphur-modified polychloroprene is a liquid or solid rubber, beginning with a Brookfield viscosity of 30 000 cP at 21° C. up to a Mooney viscosity ML 1+4, 100° C. of 120 ME.

3. A process according to claim 1, characterised in that the polychloroprene contains up to 10% by weight of 2,3-dichlorobutadiene polymerised therein.

4. A process according to claim 1, characterised in that sulphur is used in a quantity of from 0.05 to 1.0% by weight, based on monomer.

5. A process according to claim 1, characterised in that water-soluble salts of peroxodisulphuric acid in a molar quantity corresponding to from 0.03 to 0.7% by weight, based on monomer, of potassium peroxodisulphate, are used as activators.

6. A process according to claim 1, wherein $R_1$ and $R_2$ represent $C_1$–$C_4$ alkyl, and $R_3$ represents $C_1$–$C_8$ alkyl or 2,2-(2,4-dioxapentamethylene)-n-butyl.

7. A process according to claim 1, characterised in that from 0.05 to 5.0% by weight of sodium dibutyldithiocarbamate, based on monomer, or from 0.1 to 5.0% by weight of potassium methylxanthogenate, based on monomer, is used.